F. L. STUART.
CONVEYER.
APPLICATION FILED NOV. 20, 1918.
1,311,298.
Patented July 29, 1919.
7 SHEETS—SHEET 3.
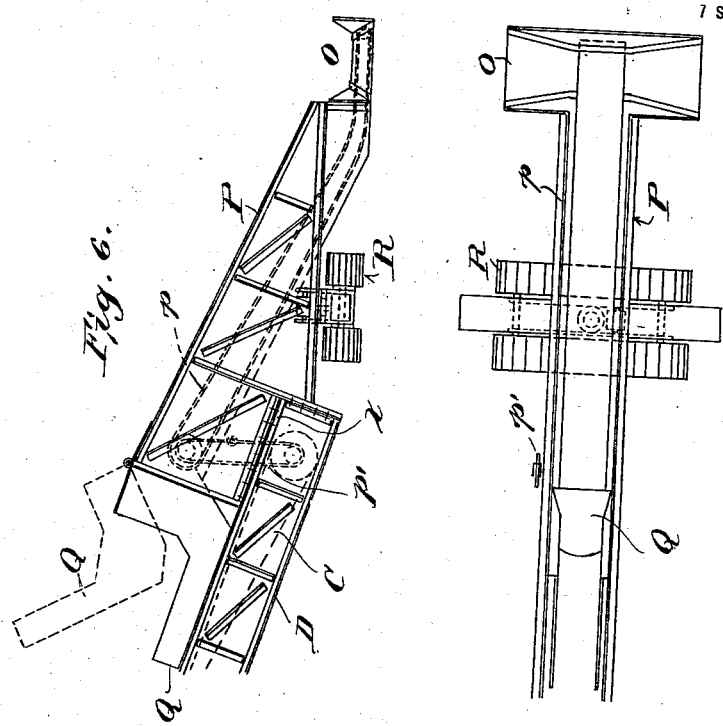
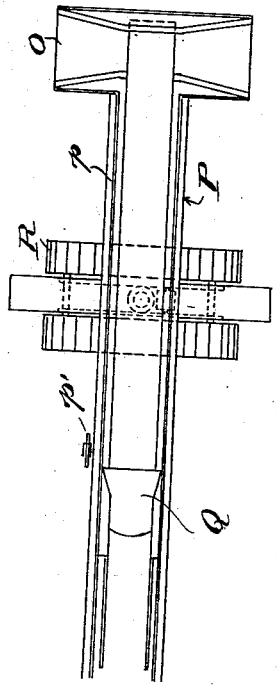
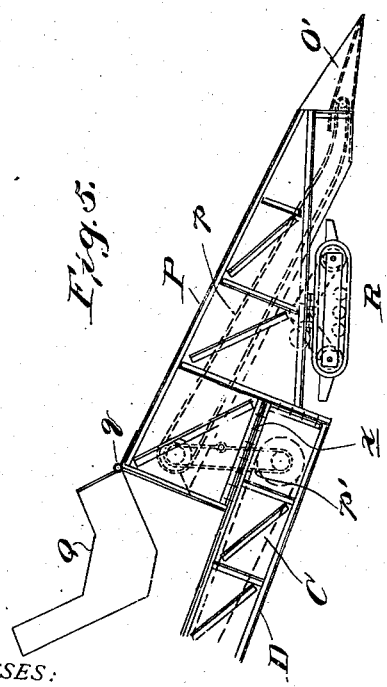
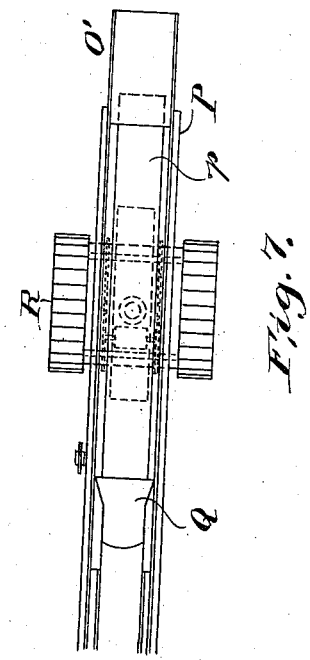
INVENTOR
Francis Lee Stuart.
BY HIS ATTORNEYS

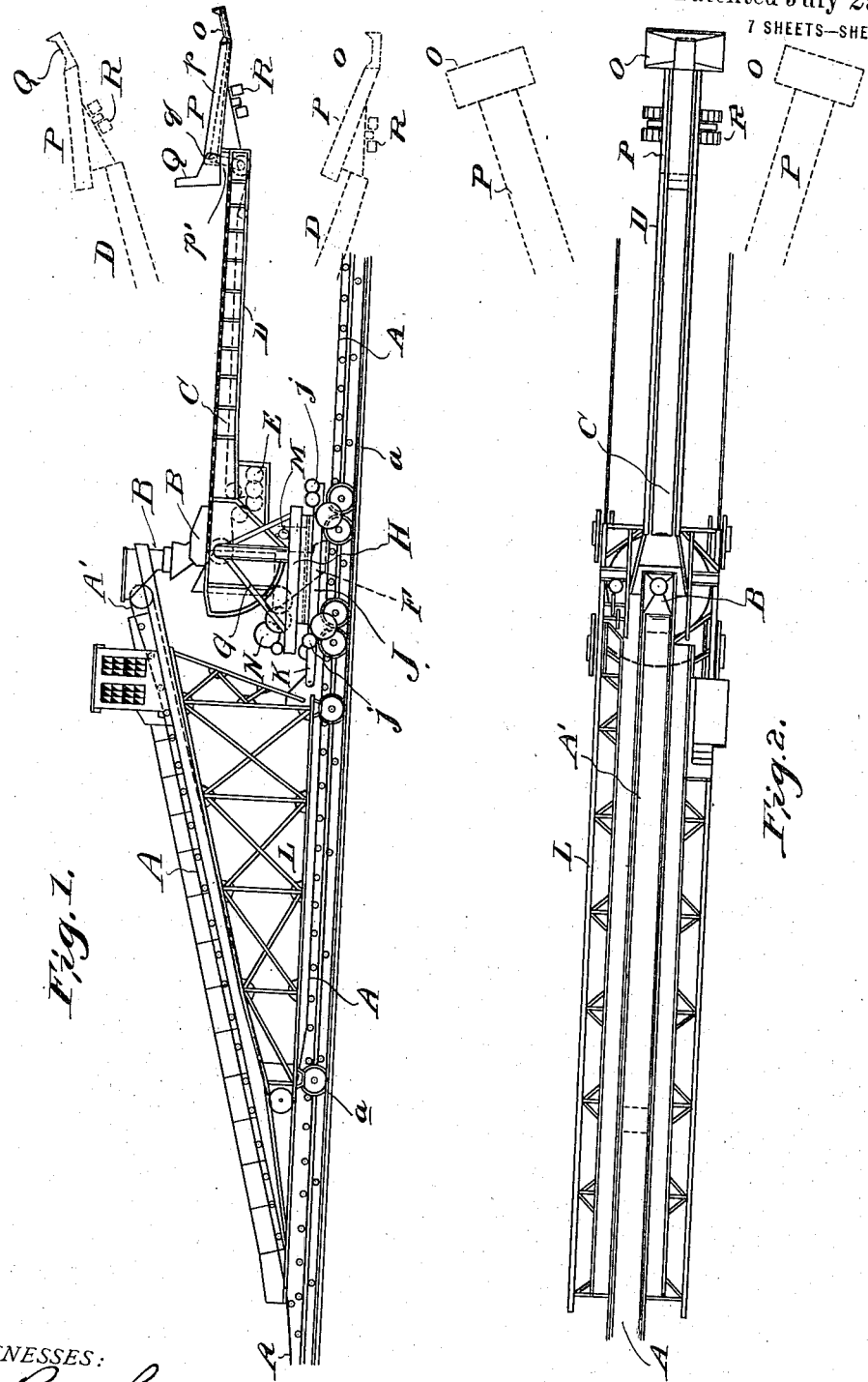

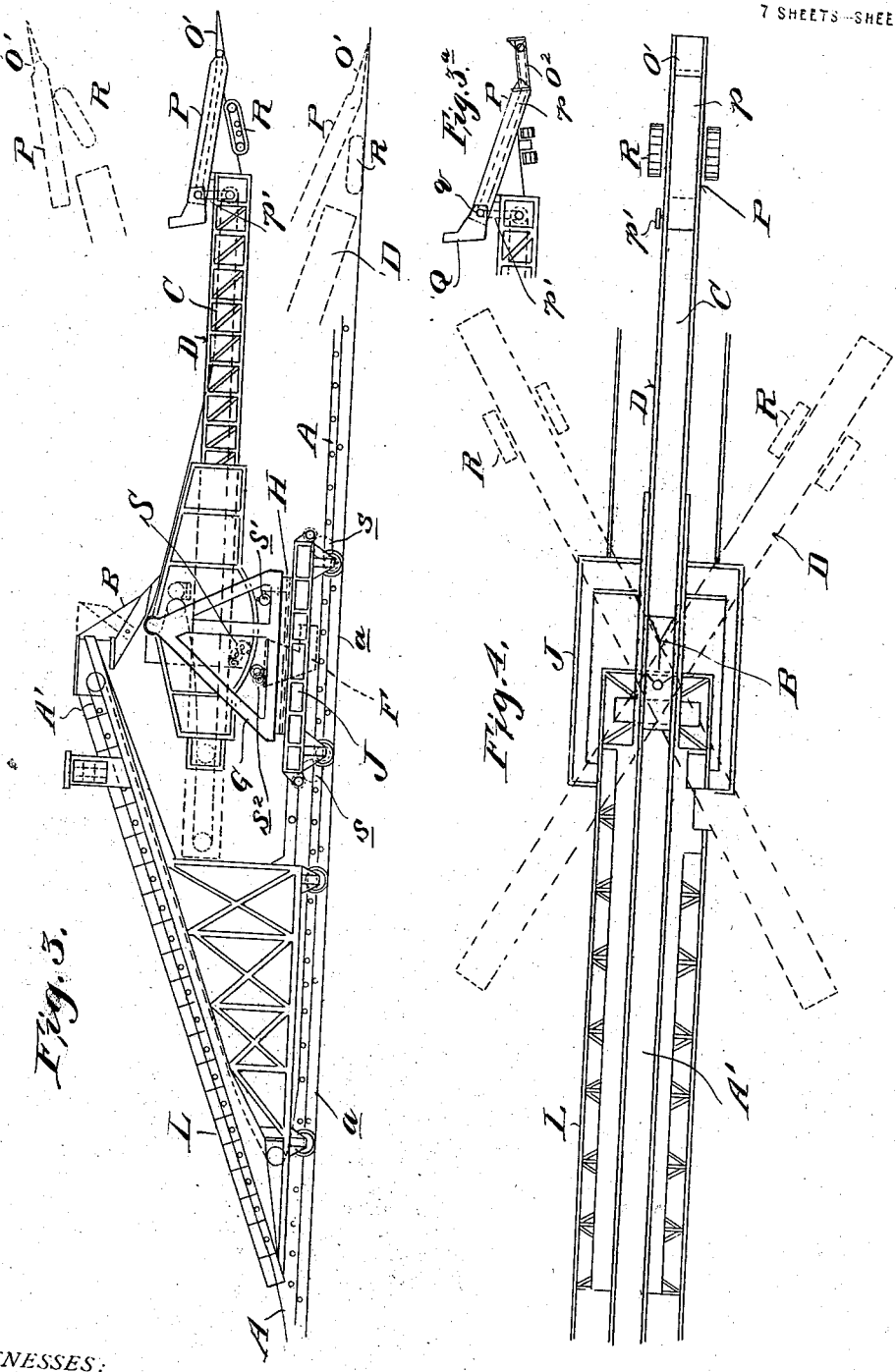

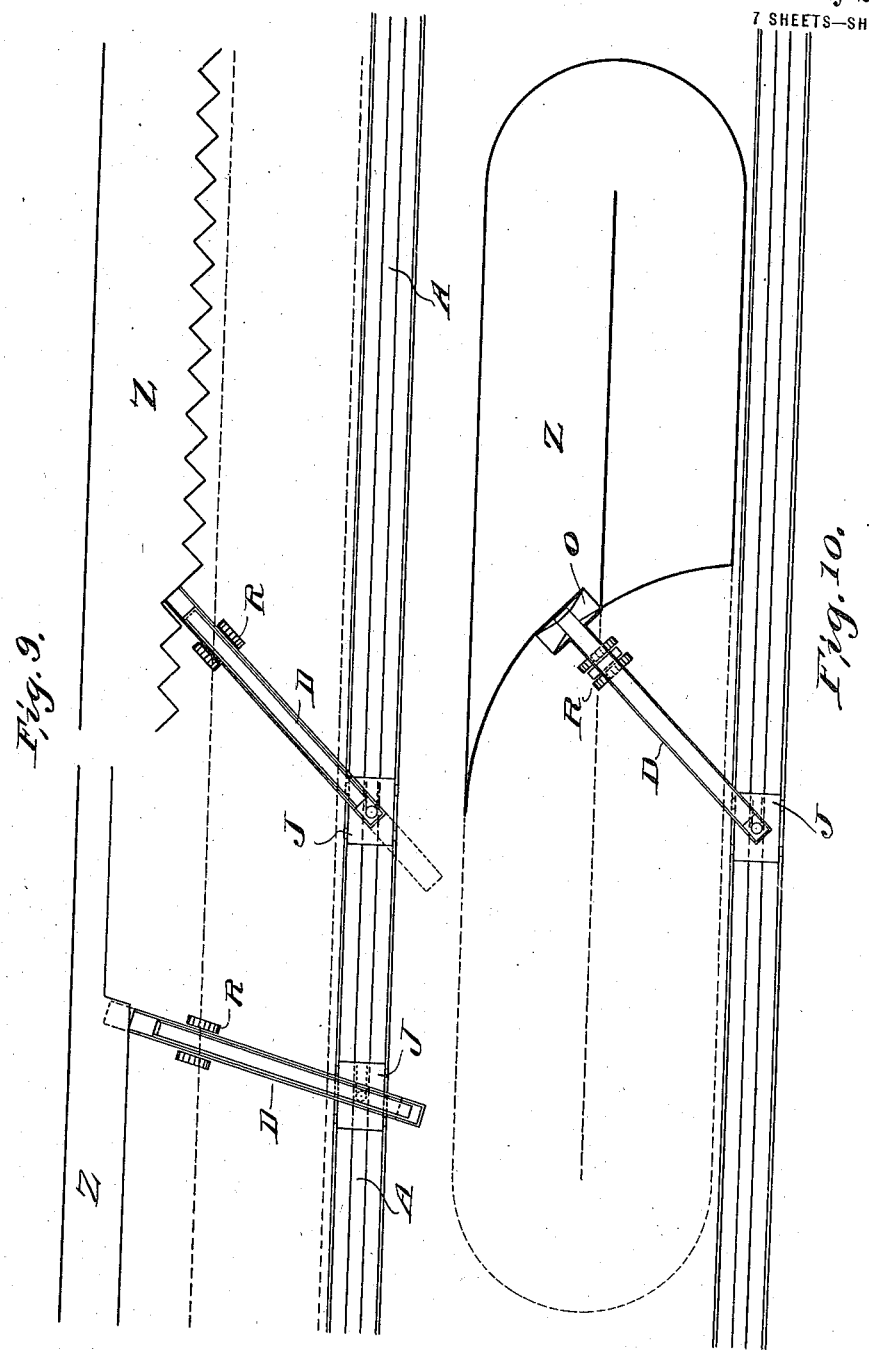

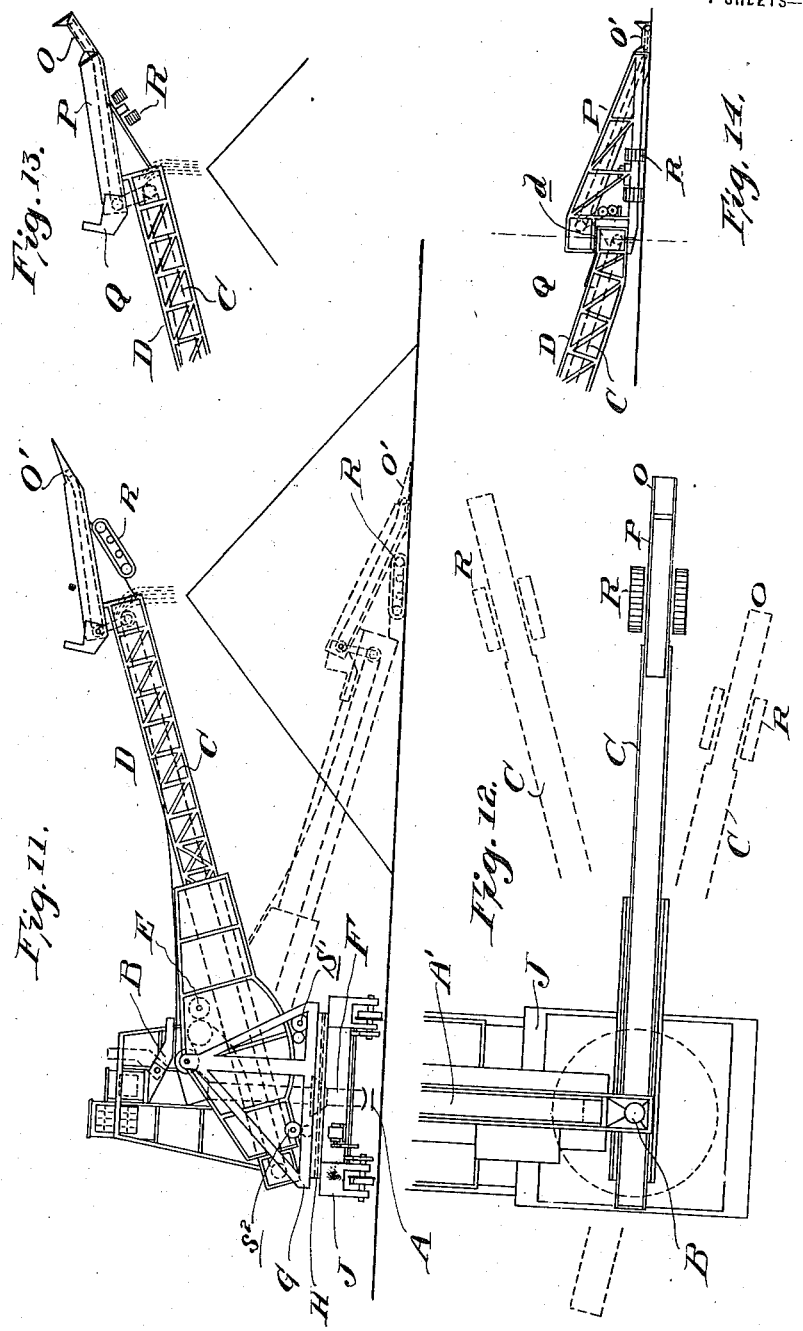

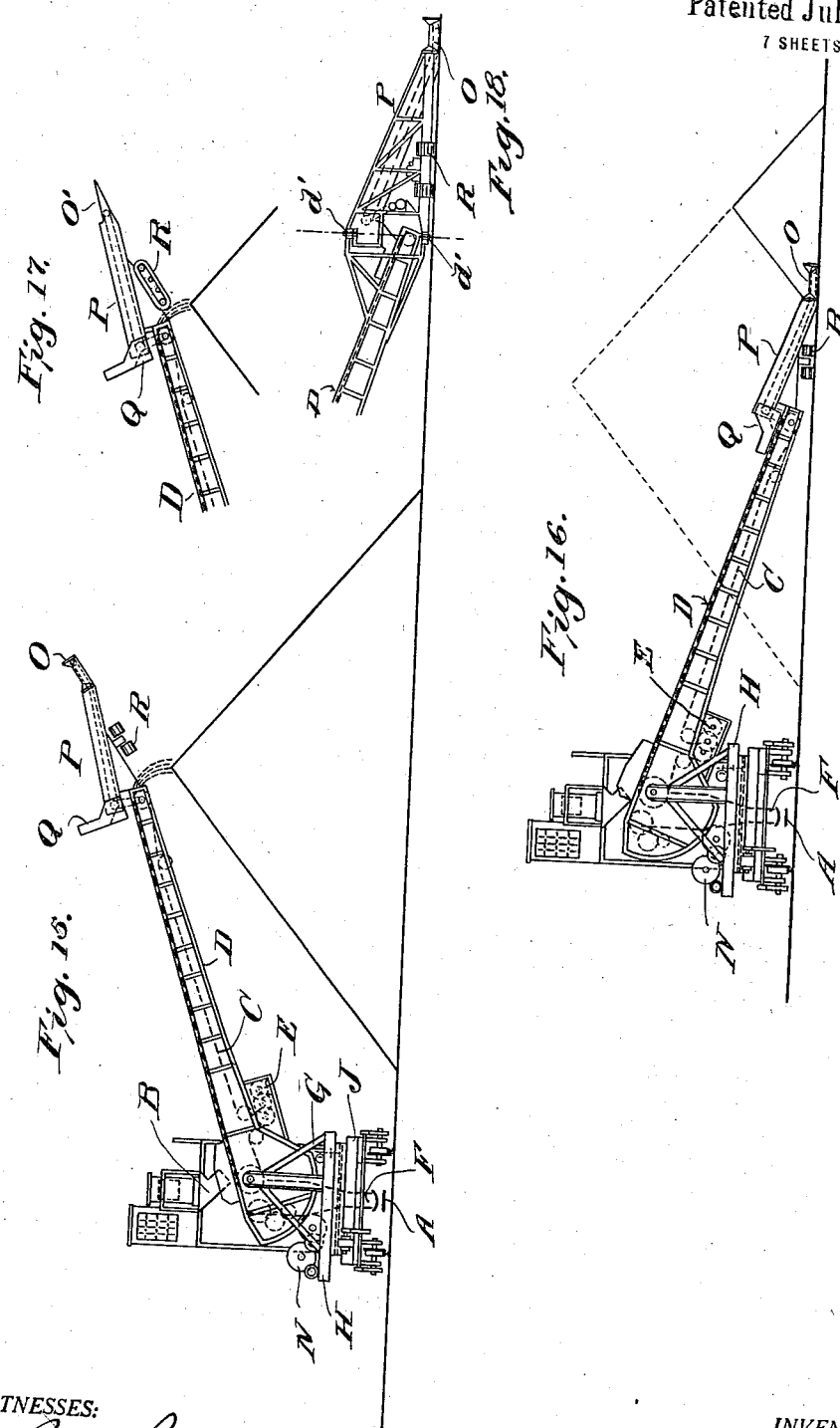

F. L. STUART.
CONVEYER.
APPLICATION FILED NOV. 20, 1918.
1,311,298.
Patented July 29, 1919.
7 SHEETS—SHEET 7.
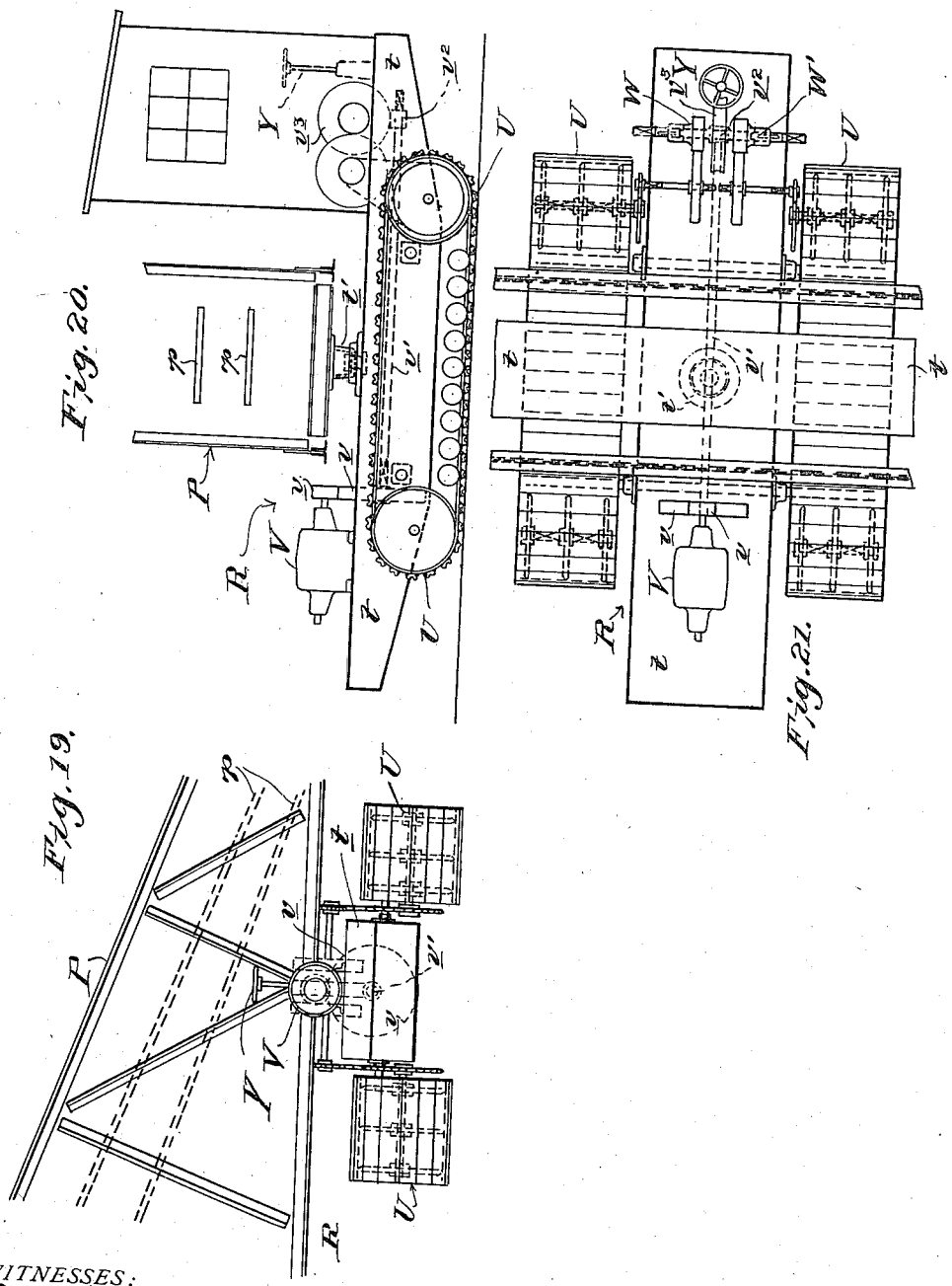
WITNESSES:
INVENTOR
Francis Lee Stuart.
BY HIS ATTORNEYS

UNITED STATES PATENT OFFICE.

FRANCIS LEE STUART, OF WASHINGTON, DISTRICT OF COLUMBIA, ASSIGNOR TO INTERNATIONAL CONVEYOR CORPORATION, OF NEW YORK, N. Y., A CORPORATION OF NEW YORK.

CONVEYER.

1,311,298.     Specification of Letters Patent.     Patented July 29, 1919.

Application filed November 20, 1918. Serial No. 263,345.

*To all whom it may concern:*

Be it known that I, FRANCIS LEE STUART, a citizen of the United States, residing in Washington, District of Columbia, have invented certain new and useful Improvements in Conveyers, of which the following is a specification.

This invention relates to apparatus for carrying material brought from a distance by a main conveyer belt to a pile or other place of storage, and also to apparatus for gathering material and depositing it upon a conveyer which carries it to a distant point, and the object of the invention is to provide improved means for operating the apparatus with greater facility and with increased power.

The apparatus herein shown and described is similar, in many respects, to the apparatus shown, described and claimed in my application for Patent No. 237,880, filed June 3, 1918, wherein the apparatus is constructed to either deposit material received from a main conveyer belt or to gather material from a pile or place of storage and deposit it on a main conveyer belt. In the apparatus shown in said application the power for operating the mechanism when gathering or reclaiming material is applied to the inner end of the reclaiming mechanism and inasmuch as the gathering devices are located at a considerable distance from such power mechanism there is, at times, undue strain on the apparatus and the power is sometimes insufficient.

According to my present invention, I apply the power for moving the gathering devices at the outer end or at the outer portion of the reclaimer. For this purpose I preferably employ a tractor of the caterpillar type and provide means for steering such tractor to enable it to direct the gathering mechanism in any desired direction.

My improvements are illustrated in the accompanying drawings, in which—

Figure 1 shows a side elevation of apparatus embodying my improvements, in which means is provided for receiving material from a main conveyer belt and depositing it in a place of storage, combined with means for gathering or reclaiming material from a place of storage and delivering it to the main conveyer belt.

Fig. 2 is a plan view of the apparatus shown in Fig. 1.

Fig. 3 is a view similar to Fig. 1 showing apparatus of the same general kind, but wherein the conveyer which delivers material to a place of storage or receives gathered material is made longitudinally extensible.

Fig. 3ª is a detail view showing a modified form of device for reclaiming or gathering material from a place of storage.

Fig. 4 is a plan view of the apparatus shown in Fig. 3.

Fig. 5 is a view on an enlarged scale of one form of gathering device which may be employed.

Fig. 6 is a similar view of another form of gathering device which may be used.

Fig. 7 is a plan view of the device shown in Fig. 5.

Fig. 8 is a plan view of the device shown in Fig. 6.

Fig. 9 is a diagrammatic view, showing how the apparatus shown in Figs. 3 and 4 may be used to reclaim material from a pile.

Fig. 10 is a diagrammatic plan view, showing how the apparatus may be employed to gather material when a scraper plow or gathering device of the kind shown in Figs. 1 and 3ª is used.

Fig. 11 illustrates how the mechanism may be adjusted either to gather material from the base of a pile or to deposit material at the top of the pile.

Fig. 12 shows diagrammatically how the conveyer which deposits material or receives material from the gathering devices may be adjusted about a vertical axis.

Fig. 13 illustrates how material may be deposited at the top of a pile when a scraper-plow gathering device is used.

Fig. 14 is a detail view, showing how the gathering mechanism may be pivotally connected with the outer portion of the reclaimer.

Fig. 15 illustrates how the apparatus when equipped with a scraper plow may deposit material on the top of a pile, the details of the apparatus being somewhat different from those shown in Fig. 11.

Fig. 16 shows the same form of apparatus as that shown in Fig. 15, but illustrates how such apparatus may be used for reclaiming material from a pile.

Fig. 17 is a detail view, showing how the apparatus deposits material on a pile when equipped with a plow operating endwise on the material.

Fig. 18 is a detail view, showing a modified form of gathering mechanism.

Fig. 19 is a detail view on an enlarged scale, showing how the tractor is connected with the outer portion of the reclaimer frame.

Fig. 20 shows a transverse section of this part of the apparatus and indicates more fully the details of construction of the tractor.

Fig. 21 is a plan view of the parts shown in Figs. 19 and 20.

In Figs. 1 and 2 of the drawings, I have shown a main conveyer belt A, provided with a loop or tripper A' which delivers through hoppers or chutes B to a belt C, carried by the frame D of the boom or reclaiming conveyer. The belt C is motor driven, as indicated at E. Said belt may deliver through a hopper F to the main conveyer belt A, but when said reclaimer belt is moved in the opposite direction it may deliver material supplied by the hoppers B to a place for storage. The reclaimer is supported by a frame G, carried by a turntable H, supported on the truck J, which is motor driven, as indicated at $j$ and traverses the track rails $a$. Said truck J is coupled at K to another truck L which supports the loop A' of the main conveyer belt. The turntable may be operated by a motor M and the reclaimer may be tilted, i. e., raised and lowered by motor mechanism N. The mechanism thus far described is similar to that shown in my application for Patent No. 237,880, filed June 3, 1918 above mentioned and to which reference is made for further details.

On the outer end of the boom conveyer frame D I mount a gathering device of suitable construction.

In Fig. 1 I have shown what is ordinarily called a "scraper plow" O mounted in a frame P and carrying a belt $p$ which receives material from the plow O and delivers it through a hopper Q to the belt C. This hopper Q is pivoted at $q$ and may be raised and lowered when required. The belt $p$ is driven by suitable connections indicated at $p'$. The frame P, to which the scraper plow is attached, is supported on a tractor R preferably of the caterpillar type and which is more clearly shown in Figs. 19, 20 and 21 of the drawings, and to which reference will be hereinafter made.

In Figs. 3 and 4 of the drawings I have shown a slight modification. Many of the parts are similar to those hereinbefore described and are similarly lettered. In this case, however, the reclaimer frame is made endwise adjustable in a manner similar to that shown in my application for Patent No. 256,678, filed Oct. 3, 1918.

In Fig. 3, S indicates motor-driven mechanism for giving an endwise movement to the reclaimer D; $s$ indicates motor-driven mechanism for driving the truck; $s'$ indicates motor mechanism for tilting the reclaiming mechanism, and $s^2$ indicates motor mechanism for operating the turntable; otherwise the apparatus is similar to that hereinbefore described and said last mentioned mechanism is similar to that shown in my application for Patent filed Oct. 3, 1918 above mentioned. In Fig. 3 the gathering mechanism is slightly different from that shown in Figs. 1 and 2. In this case instead of employing a scraper plow O, a plow O' is shown which is adapted to move endwise into the material, but as indicated in Fig. 3$^a$ a scraper plow O$^2$ may be substituted for the plow O' in the apparatus shown in Fig. 3.

In Figs. 5-8, inclusive, I have merely shown the gathering mechanism hereinbefore described on a large scale in order that the details of construction may be more fully understood.

It will be observed, by reference to Figs. 5 and 6, that the frame P is so mounted on the outer end of the frame D that it may be detached therefrom if desired, as indicated at $x$, and it will also be observed that the frame P is supported by a tractor R, which is preferably of the caterpillar type and is constructed and operated in the manner most clearly shown in Figs. 19, 20 and 21. As there illustrated the tractor comprises a truck $t$ which is pivotally connected with the frame P at $t'$. Two tractor belts U are employed. These may be of any desired construction and may be suitably supported in the truck. They are driven by a motor V which is geared, as indicated at $v$, to a shaft $v'$, which is geared at $v^2$ to a worm wheel $v^3$. This worm wheel is adapted to be connected with either one of the tractor belts U or with both of them by suitable clutch mechanism. The clutch mechanism W on one side is geared to one of the tractor belts and the clutch mechanism W' on the opposite side of the worm wheel is geared to the other tractor belt. By means of suitable operating mechanism Y the clutch may be operated to connect both tractor belts with the driving mechanism or connect only one of the tractor belts with said driving mechanism, so that the apparatus may be steered in the desired way. By employing mechanism of the kind described the reclaimer may be moved longitudinally of itself or moved forward at any desired angle with reference to the main conveyer belt or it may be swung in the arc of a circle about the axis of the turntable as a center.

When apparatus of the kind illustrated in Figs. 3 and 4 is employed, the mechanism may be operated in the manner indicated in Fig. 9, where it will be observed that the truck J is moved longitudinally over the main conveyer belt and the reclaiming conveyer is projected longitudinally of itself or at an angle to the main conveyer belt to gather material from the pile Z. In this case the tractor belts U are arranged parallel with the longitudinal axis of the reclaimer.

In Fig. 10 where a scraper plow is employed the tractor is arranged transversely with reference to the longitudinal axis of the reclaimer and the material is gathered from the pile by the scraper plow moving in the arc of the circle, it being understood that the tractor may be steered or turned when desired to move the reclaimer forward for the next operation.

Under various conditions it is desirable to move the reclaimer in various ways and at various angles, as partially indicated in Figs. 9 and 10, and by providing the tractor with the steering mechanism described the movement of the gathering mechanism may be controlled at will.

As before stated, the apparatus may be employed to store material or to gather it.

Fig. 11 illustrates how apparatus of the kind shown in Fig. 3 may be employed to deposit material on a pile and also, by dotted lines, how the same apparatus may be used to gather material from the pile.

In Fig. 15 I have indicated how my improvements may be applied to an apparatus which is similar to that hereinbefore described but in which no provision is made for giving an endwise movement to the reclaimer. Fig. 15 shows how the material may be deposited on top of the pile, while Fig. 16 shows how the same apparatus may be used for gathering material.

In Fig. 14 I have shown a modified way of connecting the frame P with the frame D of the reclaimer. In this case a pivotal connection is made at $d$ but this feature is not claimed herein.

Another modification is shown in Fig. 18 wherein the frame P is detachably connected at $d'$ with the frame D and this connection may be also a pivotal one. Similar subject matter is shown in my application for Patent No. 258,355, filed Oct. 16, 1918 in which I have claimed, among other things, reclaiming apparatus comprising a reclaiming conveyer supported at one end to swing about a vertical axis and provided at its outer end with a gathering section which is pivotally connected with the main portion of said reclaiming conveyer, and a tractor for supporting and moving said gathering section about its pivotal connection with the reclaiming conveyer, and I have also claimed in such application the subject matter just referred to in which detachable connections are provided between the gathering section and the main portion of the reclaiming conveyer.

The principal feature of novelty claimed in this application is the means for applying power directly to the outer portion of the reclaimer and the means for steering the tractor mechanism.

It is also evident that by properly operating and steering the tractor the truck J to which the reclaimer is pivoted may be moved coincidentally or simultaneously with the reclaimer. It may be held stationary while the reclaimer is swung in the arc of a circle, or when the reclaimer is set at an angle to the main conveyer belt the tractor may be so steered and operated as to move the truck forward or backward while the gathering end of the reclaimer enters a pile at various angles progressively.

When the reclaiming apparatus is of the kind shown in Figs. 3 and 4 and also in Fig. 9 of the drawings, the tractor may be employed for giving an endwise movement to the reclaimer in addition to the movements hereinbefore explained.

The tractor may be used to operate the reclaimer to move it endwise or to swing it about its pivotal connection with the truck J either alone or in connection with the motor mechanism hereinbefore described for giving such movements to the reclaimer, but the use of a tractor on the outer portion of a reclaimer is important when reclaiming inasmuch as it affords means for giving great force or power to the reclaimer and avoids the strain which would otherwise be incident to the operation of the mechanism.

I claim as my invention:

1. Reclaiming apparatus, comprising a main conveyer belt, a truck mounted to move over said belt, a conveyer frame carried by the truck and pivotally connected therewith to move about both vertical and horizontal axes, a conveyer belt carried by said frame and delivering to the main conveyer, a gathering device detachably secured to the outer portion of the frame which delivers to the conveyer belt thereon, and a caterpillar tractor pivotally connected with said gathering device and detachable therewith from said conveyer frame which supports said gathering device and said conveyer frame, moves it about its pivotal connection with the truck and by reason of its pivotal connection may be set to move the conveyer frame with the truck which supports it longitudinally with reference to said main conveyer belt.

2. Reclaiming apparatus, comprising a main conveyer belt, a truck mounted to move over said belt, a conveyer frame pivotally connected with the truck to move thereon about both vertical and horizontal axes, motor mechanism on the truck for giving to said frame movement about its vertical and horizontal axes, a conveyer belt in said frame, a gathering device on the outer end of the frame which delivers to the conveyer belt therein, a caterpillar tractor supporting the outer portion of the conveyer frame and which has pivotal connection therewith, and means for steering said tractor, the arrangement being such that said tractor may operate in conjunction with the motor mechanism on the truck to move the conveyer frame about its vertical axis or may be used alone to give such movement.

3. Apparatus for stacking and reclaiming material, comprising a main conveyer belt, a truck mounted to move parallel therewith, a conveyer frame pivotally connected with the truck to turn thereon about a vertical axis, a conveyer belt mounted in said frame, a gathering device at the outer end of said frame, means for delivering material from the main conveyer belt to said last mentioned conveyer, means for delivering material from said last mentioned conveyer to the main conveyer belt, and a tractor supporting the outer portion of said conveyer frame for moving it about its vertical axis.

4. Reclaiming apparatus, comprising a main conveyer belt, a truck mounted to move over said belt, a turntable on said truck, a conveyer frame mounted on said turntable and movable endwise relatively thereto, a conveyer belt carried by said frame and delivering to the main conveyer belt, a gathering device on the outer portion of said frame which delivers to the conveyer belt therein, and a tractor pivotally connected with the outer portion of said frame which supports said frame and moves it about its pivotal connection with said truck.

5. Reclaiming apparatus, comprising a truck, a conveyer frame carried by said truck and pivotally connected therewith to move about both vertical and horizontal axes, a conveyer belt carried by said frame, a gathering device on the outer portion of said frame which delivers to the conveyer belt therein, and a tractor pivotally connected with the outer portion of said frame comprising two tractor belts or treads, means for driving them and means for connecting the driving mechanism with both of said tractor belts to propel the tractor or with either of said tractor belts to steer it.

6. Reclaiming apparatus, comprising a main conveyer, a truck mounted to move parallel therewith, a boom conveyer carried by said truck mounted thereon to turn about a vertical axis and extensible endwise with reference to the truck, a gathering device on the outer end of the boom conveyer and which delivers thereto, and a tractor which supports the outer end of said boom conveyer for moving it about its vertical axis and for also extending it or moving it endwise relatively to the truck.

7. Reclaiming apparatus comprising a main conveyer belt, a truck mounted to move in operative relation therewith, a turntable mounted on said truck, a frame carried by said turntable, a cradle pivotally connected with said frame to move about a horizontal axis, a boom conveyer frame movable longitudinally in said cradle, a gathering device on the outer portion of said frame which delivers to the conveyer belt thereon, and a tractor pivotally connected with the outer portion of said frame for supporting said frame, for adjusting or moving said boom conveyer frame longitudinally with reference to its pivotal connection and for moving said boom conveyer about its pivotal connection with said truck.

8. Apparatus for stacking and reclaiming material comprising a main conveyer belt, a truck mounted to move parallel therewith, a turntable on said truck mounted to turn about a vertical axis, a cradle supported on the truck adapted to move about a horizontal axis, a boom conveyer movable longitudinally in said cradle, a gathering device at the outer end of said boom conveyer, means for delivering material from the main conveyer belt to said last mentioned conveyer, means for delivering material from the said last mentioned conveyer to the main conveyer belt and a tractor supporting the outer portion of said conveyer frame for moving the boom conveyer longitudinally or endwise across said truck and for rotating said frame about its pivotal connection.

In testimony whereof I have hereunto subscribed my name.

FRANCIS LEE STUART.